Sept. 15, 1953

R. E. GRAHAM 2,652,534

SWITCHING APPARATUS FOR ELECTRON TUBE CAPACITANCE MEASUREMENTS

Filed Oct. 19, 1950

INVENTOR
ROBERT E. GRAHAM
BY
*J. Albert Hultquist*
ATTORNEY

Sept. 15, 1953 R. E. GRAHAM 2,652,534
SWITCHING APPARATUS FOR ELECTRON
TUBE CAPACITANCE MEASUREMENTS
Filed Oct. 19, 1950 2 Sheets-Sheet 2

INVENTOR
ROBERT E. GRAHAM
BY
ATTORNEY

Patented Sept. 15, 1953

2,652,534

UNITED STATES PATENT OFFICE 2,652,534

SWITCHING APPARATUS FOR ELECTRON TUBE CAPACITANCE MEASUREMENTS

Robert E. Graham, Floral Park, N. Y., assignor to Sylvania Electric Products Inc., a corporation of Massachusetts Application October 19, 1950, Serial No. 190,971

12 Claims. (Cl. 324—60)

This invention relates to switching apparatus for electron tube capacitance measurements, and more particularly, to apparatus in which the various inter-electrode capacitances of a tube may be measured without the necessity of manually changing the coaxial cable connections to the terminals of the tube heretofore customary in such measurements. It will be understood that with modern tubes having as many as nine electrode terminals, the rearranging of the coaxial cable connections to determine the different inter-electrode capacitances may be very time consuming.

It is an object of this invention to provide apparatus to receive a tube to be tested, with switching means by which any desired measurement set up may be made simply by operating switches and without manually rearranging coaxial cable connections.

It is a further object of this invention to provide such apparatus in which the switching may be done either manually or by the use of punched cards.

It is another object of this invention to provide apparatus by the use of which a large number of tube capacitance measurements may be made in a minimum of time.

It is a further object of this invention to provide such apparatus in which the accuracy of measurements is not impaired by the use of the switching circuits.

It is a further object of this invention to provide such apparatus using a number of power operated relays with the relay control circuits so co-ordinated that operation of a pair of manual switches corresponding to the particular electrodes of the tube, the capacitance between which is to be measured, operates all the relays necessary to connect the two electrodes to the input circuit of the bridge and grounds all other electrodes.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Conventional methods of measuring tube capacitance, although sufficiently accurate, are so time consuming that even sample testing of tubes for all desired capacitances often requires longer periods of time than complete checks for all other characteristics. This is especially true in the case of the more complex tube structures, such as the dual structure triodes, and more recently, the dual-tetrodes and dual-pentodes in subminiature and 9-pin envelopes.

The most time consuming feature of the conventional methods of using a direct capacitance measuring bridge is the standard adapter which employs individual, grounded-sheath coaxial cables for connections to tube elements and the necessary rearrangement of these cables for each desired measurement. For example, on a dual-triode, which requires the testing of eight different capacitance values, seven to nine coaxial cables have to be rearranged eight separate times. Where large groups of tubes of a single type are to be tested, it is possible to cut down set-up time by connecting the adapter only once for each desired capacitance measurement and running all tubes through before changing to the next set-up. Although this reduces the number of coaxial cable connector changes, it requires that each tube be inserted into the adapter once for each desired measurement. This multiple tube insertion, which is suitable for based tubes, is impractical in the case of unbased tubes such as subminiatures, due to the difficulty of tube insertion caused by the use of flexible leads in the tubes for element connections.

The apparatus according to my invention makes it possible to test a dual-triode tube within a small fraction of the time required by the conventional coaxial cable method and with only one tube insertion. The reduction of set-up time is possible because the rearrangement of terminal connections is accomplished by a relay switching system operated from a control panel. This saving in time is accompanied by an accuracy equivalent to conventional methods.

In order that the effectiveness of the switching apparatus may be better understood, it is desirable to review the theory of direct capacitance measurement. A direct capacitance measuring bridge is, as the title indicates, a device which permits the direct measurement of the capacitance between any two elements of an electronic tube independently of the other capacitances within the tube structure. See for example, "Measuring Inter-Electrode Capacitance" by C. H. Young, Bell Laboratories Record, volume XXXV, pp. 433–438, December 1946.

Figure 1:
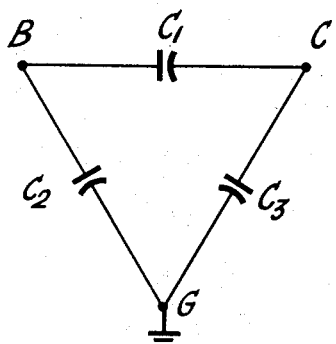
Figure 1 is a three-terminal network diagram of a direct measurement capacitance bridge.

The bridge circuit may be represented by a three-terminal network shown in Figure 1. Points B and C are the terminals between which the desired capacitance is placed for measurement and G is the shield or ground terminal. The bridge is so designed that the indicated capacitance value is proportional to $C_1$ and is independent of $C_2$ and $C_3$. If terminals B and C are connected to the tube under test by means of individual, grounded-sheath coaxial cable connections, it will be seen that only capacitances from B and C to G (ground) are added to the bridge. It will also be seen that the tube connections can be so arranged as to place the capacitance to be measured between B and C, and all other capacitances between B and G or C and G. Because the bridge is insensitive to capacitances from B and C to ground, it is possible to obtain a direct inter-electrode capacitance measurement between the elements connected to B and C. For example, the grid-to-plate capacitance of a triode may be measured independently of the grid-to-cathode or plate-to-cathode capacitances simply by connecting the grid to terminal B, the plate to terminal C and the cathode to G. In this manner, grid-to-cathode and plate-to-cathode capacitances will be applied from B to G and from C to G respectively and will have no effect on the measurement of the desired grid-to-plate capacitance from B to C.

Figure 2:
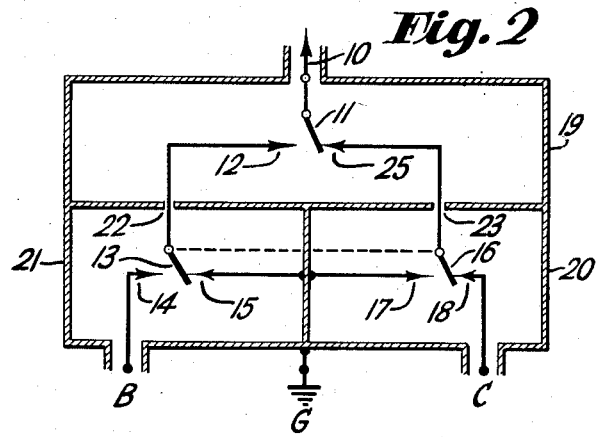
Figure 2 is a simplified circuit diagram of apparatus according to my invention for dealing with one tube terminal.

The system according to my invention is diagrammatically illustrated in simplified form in Figure 2, in which 10 is a conductor leading to one of the tube electrodes. Conductor 10 is connected to the blade of switch 11, which may be a relay. The two switch contacts 25 and 12 are connected to the blades of switches 16 and 13 respectively, these switches being ganged. Contact 17 of switch 16 and contact 15 of switch 13 are connected to ground and contact 18 of switch 16 is connected to the C terminal of the bridge, while contact 14 of switch 13 is connected to the B terminal of the bridge. Switches 11, 16 and 13 and their associated wiring are mounted in grounded shielding containers 19, 20 and 21 respectively, with only the lead from contact 25 passing from container 19 to container 20 through opening 23 and only the lead from contact 12 passing from container 19 to container 21 through opening 22. As many circuits such as shown in Figure 2 may be employed as there are electrodes in the tubes to be measured. For a tube having nine internal electrodes and an external shield, the circuit of Figure 2 will be repeated ten times with each of the nine electrodes connected to one terminal 10, and the external shield connected to the tenth terminal 10.

With the switches in the position shown, the tube terminal is connected to bridge terminal C. The stray capacitance across switch 13 is from B to ground and across switches 11 and 16 it is from C to ground. As previously pointed out, these capacitances are not objectionable from the standpoint of measurement accuracy. The only possible stray capacitance between B and C is from the B wiring to contact 14 in container 21 to the C wiring to contact 25 in container 19. This undesirable capacitance can be held to an acceptable minimum provided that hole 22 is effectively plugged by the grounded conductor passing through it. For maximum shielding between the containers, the opening 22 should be small, the conductor passing through it be almost as large as the hole and the insulation of the conductor should be thin. The same applies to opening 23. In practice, these conditions are met by using plastic covered radio hook-up wire passing through holes of a diameter equal to the insulation diameter. When switch 11 is thrown to the other position from that shown in Figure 2, the tube terminal is connected to ground. This can also be accomplished by throwing switches 16 and 13 without changing switch 11. When all the switches are thrown the other way from that shown in Figure 2, the tube terminal is connected to bridge terminal B. Inspection will show that in no case is there a possibility for stray capacitance to occur between terminals B and C.

Figure 3:
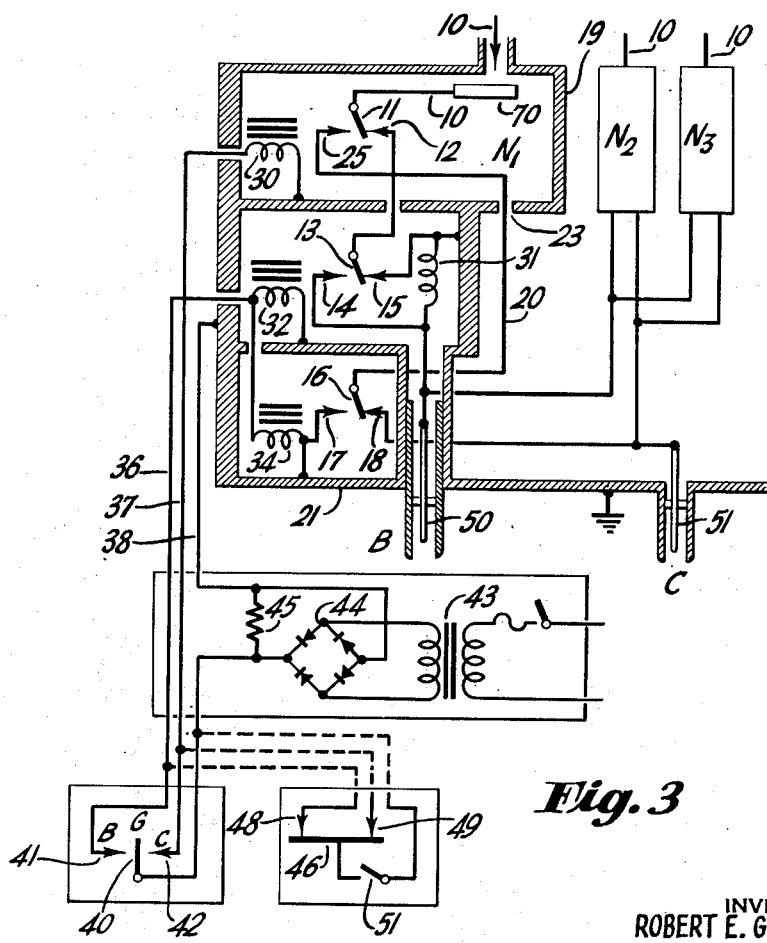
Figure 3 is a complete circuit diagram of apparatus according to my invention for dealing with one tube terminal.

Figure 3 shows the circuit diagram of one set of relays and their connections and the power supply for operating them, it being understood that everything but the power pack, bridge terminals B and C and inductance 31 are duplicated ten times for a tube with nine electrodes and an external shield. For simplicity of drawing only three groups of relays are shown, these designated as $N_1$, $N_2$, and $N_3$. In this figure, the same reference characters indicate the same elements as in Figure 2. Relay winding 30 actuates switch 11, winding 32 switch 13 and winding 34 switch 16. One terminal of each of these windings is grounded and the other terminal of windings 30, 32, and 34 leads through conductors 37 and 36 to manual switch contacts 42 and 41 respectively. It will be noted that both windings 32 and 34 are supplied through conductor 36 and that an inductance 31 is connected across switch terminals 14 and 15. The value of this inductance is of the order of 1.5 millihenries. Power is supplied to the relays from any suitable source, such as the 60 cycle house supply through transformer 43 and rectifier system 44 with resistance 45 between positive and negative sides and the negative side is grounded through conductor 38. Shielded connectors 50 and 51 connect to the bridge terminals. The blade of switch 40 is connected to the positive side of the power supply. When switch 40 is closed against contact 41, the B contact, switches 13 and 16 are thrown to close against contacts 14 and 17. Operation of switch 13 connects conductor 10 to the B contact of the bridge as will be seen. The operation of switch 16 serves to plug hole 23. When switch 40 is closed against contact 42, the C contact, switch 11 is thrown against contact 25 connecting conductor 10 through switch 16 and contact 18 to bridge contact 51, the C contact. When switch 40 is open, the conductor 10, and hence the tube electrode, is connected to ground, as can be seen from Figure 3.

Switch 40 is arranged for manual operation and in parallel therewith I may provide, if desired, a switch operating from punched cards. This may have spring contact 48 in parallel with contact 41, a second spring contact 49 in parallel with contact 42 and a conducting plate 46 on which they bear, in parallel with the blade of switch 40. To prevent short-circuiting when no card is in place, switch 51 may be provided to cut the power off from plate 46. Contacts 48 and 49 are duplicated ten times, but only one switch 51 is required. Insertion of a card punched for either B or C operation in the "card reader" will have the same effect as closing switch 40 to either B or C position.

Figure 4:
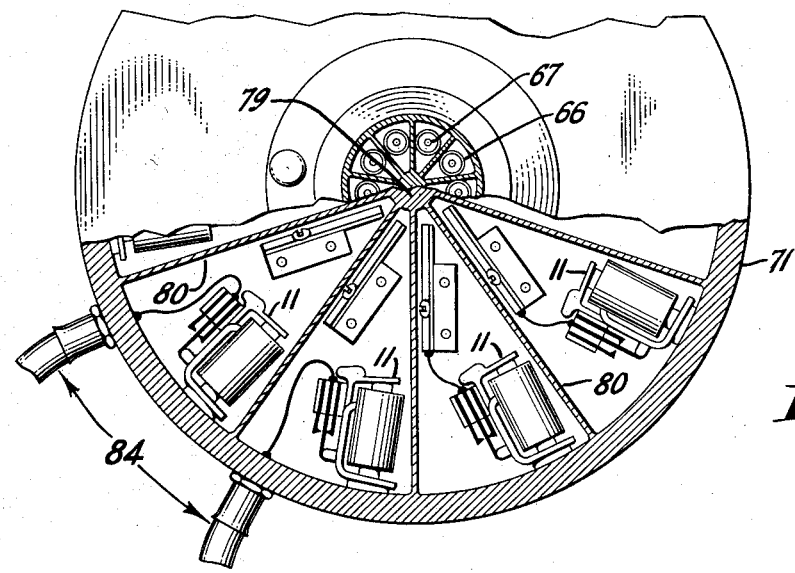
Figure 4 is a top plan view of a tube adapter and switching apparatus according to my invention, partly broken away.
Figure 5:
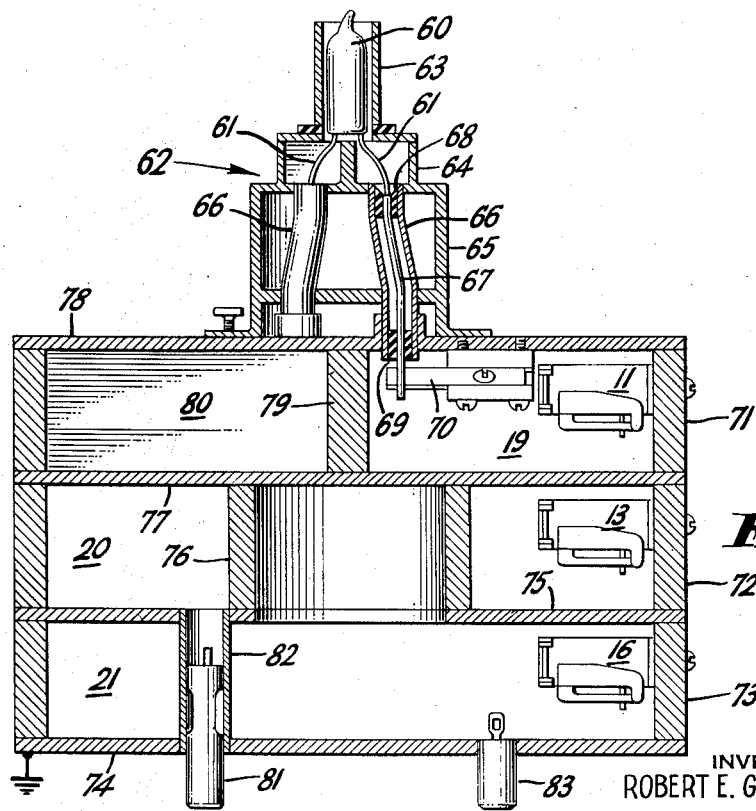
Figure 5 is a vertical section of the apparatus shown in Figure 4.

One way in which the apparatus according to my invention may be arranged is shown in Figures 4 and 5. In this embodiment of the invention all of the relays 11 are arranged in a ring at the top, all of the relays 13 in a second ring below and all of the relays 16 in a third ring at the bottom. All of the relays 11 may be secured to the inner periphery of a metallic ring 71, all the relays 13 to the inner periphery of a second metallic ring 72 and all the relays 16 to the inner periphery of a third metallic ring 73. The relays of each ring may be shielded from each other by separating metallic discs 75 and 77, the former carrying a cylindrical, vertically-extending extension 76 and top and bottom rings are closed by bottom and top conducting plates 74 and 78. A conducting tube 82 extends through plates 74 and 75 carrying contact 81 to be connected to the bridge B contact, the contact 81 being connected to all the contacts 14 of the relays 13 and the C contact 83 extends through plate 74 and is connected to all the contacts 18 of the relays 16. The relays 11 are shielded from each other by radially extending metallic plates 80 extending from center post 79 to outer ring 71. The electron tube 60, having flexible leads 61 extending from it, is plugged into a metallic adapter 62 which shields each individual lead and may be in the form of a metallic turret having a portion 64 in which the leads are fanned out and a larger diameter portion 65 at the bottom containing the shielded leads to the relays 11. Each shield is a metal tube 66 carrying within it a smaller hollow nickel tube 67, the upper and lower ends of which pass through insulating blocks 68 and 69, and the upper of which may be funneled on its upper surface to facilitate inserting the tube leads into the upper end of the inner tubing 67. The electron tube shield 63 is insulated from the adapter and may be connected to a connector 84 shown in Figure 4. The entire adapter may be bolted to the top plate 78, the shielding tubes 66 pass through appropriate openings in the top plate and the lower ends of the inner tubes 67 are connected to the blades of each relay switch 11 respectively.

While the adapter shown is particularly designed for subminiature tubes having no bases, it will be understood that other adapters may be provided, with a similar construction to receive other tubes.

It was mentioned earlier that direct capacitance bridges measure the capacitance between terminals B and C and are insensitive to capacitances from B and C to ground. There are, however, practical limitations on the values of these capacitances. For the Sylvania direct capacitance measuring bridge model 125, capacitances from B to ground should be kept below 25 micromicrofarads. Capacitances from C to ground should be less than 300 micromicrofarads for accurate measurement of capacitances in the order of thousandths of micromicrofarads, such as grid-to-plate capacitance values. However, the total capacitance from C to ground may be permitted to rise to a considerable extent when the capacitance values to be measured are greater. If the limitations of total capacitance to ground are exceeded, the bridge balance null will become too broad to permit accurate reading and the bridge zero balance point (no capacitance between terminals B and C) will be shifted away from the zero calibration on the dial. If the capacitance from B to ground is too high, the inductance 31 (Figure 3) is provided to resonate out part of this capacitance.

In this specification, I have explained the principles of my invention and the best mode in which I contemplate applying those principles so as to distinguish my invention from other inventions, and I have particularly pointed out and distinctly claimed the part, improvement, or combination which I claim as my invention.

While I have shown and described certain preferred embodiments of my invention, it will be understood that modifications and changes may be made without departing from the spirit and scope of my invention, as will be clear to those skilled in the art.

What I claim is:

1. Switching apparatus for a direct capacitance measuring bridge having B and C input terminals, comprising N conductors each adapted to be connected to a lead to an electrode of an electron tube, and N groups of switches, each group having first, second and third switches, one of said conductors being connected to the first switch in each of said groups respectively, said first switch having contacts selectively closable connected to said second and third switches respectively and said second and third switches having contacts selectively closable, one of said contacts of said second and third switches being connected to ground, and the other contact in said second and third switch being connected to the B and C terminals of said bridge respectively.

2. The combination claimed in claim 1 in which each of said switches is operated by a relay, and manual means for selectively controlling the actuation of the switches of different groups.

3. The combination claimed in claim 1 in which each of said switches is operated by a relay, and manual means for selectively controlling the actuation of the switches of different groups, and the actuation of the second and third switches in the respective groups being ganged.

4. The combination claimed in claim 1 in which each of said first switches is individually shielded.

5. The combination claimed in claim 1 in which each of said first switches is individually shielded, all said second switches are shielded as a group and all said third switches are shielded as a group.

6. The combination claimed in claim 1 in which all said first switches are mounted on the inner periphery of a shielding ring, all said second switches are mounted on the inner periphery of a second shielding ring positioned below and coaxial with said first shielding ring, and all said third switches are mounted on the inner periphery of a third shielding ring positioned below and coaxial with said second ring.

7. The combination claimed in claim 1 in which all said first switches are mounted on the inner periphery of a shielding ring, all said second switches are mounted on the inner periphery of a second shielding ring positioned below and coaxial with said first shielding ring, and all said third switches are mounted on the inner periphery of a third shielding ring positioned below and coaxial with said second ring, and an adapter for receiving a tube mounted coaxial with and above said first ring.

8. Switching apparatus for a direct capacitance measuring bridge having B and C input terminals, comprising a first shielding compartment, a conductor entering said compartment adapted to be connected to a lead to an electrode of a vacuum tube, a first switch within said compartment having a moving contact arm to which said conductor is connected, and a second and third switch, each of said switches being within individual shielding compartments, said first switch having a pair of stationary contacts, selectively engageable by said moving contact arm and connected to the moving contact arms of said second and third switches respectively, and said second and third switches each having a pair of stationary contacts selectively engageable by moving contact arms, one of said stationary contacts in each of said second and third switches being connected to the respective shielding compartment, and the other stationary contact in said second and third switches being connected to leads extending one from each compartment for connection to the B and C terminals of said bridge respectively.

9. A circuit arrangement for selectively switching a connection to either one of a pair of terminals and a ground terminal including first, second and third switches within individual shielding compartments and each having a moving arm and a pair of fixed contacts, the moving arm of said first switch being connected to said connection, the fixed contacts of said first switch being respectively connected to the moving arms of said second and third switches and said moving arms being coupled together for simultaneous motion, one of the fixed contacts of said second and third switches being connected to each of said terminals and the remaining fixed contacts being connected to ground.

10. A switching apparatus for a capacitance bridge having a pair of input terminals comprising a number of circuit arrangements as set forth in claim 9, one for each of a number of conductors, all of said fixed contacts of said second switches which are not connected to ground being connected to one of said input terminals; and all of said fixed contacts of said third switches which are not connected to ground being connected to the other of said input terminals.

11. A circuit arrangement for selectively switching a connection to either one of a pair of terminals and a ground terminal including first, second and third switches each within and individual shielding compartment and having a moving arm and a pair of fixed contacts, the moving arm of said first switch being connected to said connection, the fixed contacts of said first switch being respectively connected to the moving arms of said second and third switches and said moving arms being coupled together for simultaneous motion, one of the fixed contacts of said second and third switches being connected to each of said terminals and the remaining fixed contacts being connected to ground, the arms of said second and third switches being coupled for simultaneous movement so that when one of said arms engages one of said contacts which is grounded, the other engages one of said contacts connected to one of said terminals.

12. A switching apparatus for a capacitance bridge having a pair of input terminals comprising a number of circuit arrangements as set forth in claim 11, one for each of a number of conductors, all of said fixed contacts of said second switches which are not connected to ground being connected to one of said input terminals, and all of said fixed contacts of said third switches which are not connected to ground being connected to the other of said input terminals.

ROBERT E. GRAHAM.

References Cited in the file of this patent

UNITED STATES PATENTS

| Number | Name | Date |
| --- | --- | --- |
| 562,564 | Allen | June 23, 1896 |
| 2,026,303 | Curran | Dec. 31, 1935 |
| 2,116,606 | Lemmon | May 10, 1938 |
| 2,198,242 | Buchard | Apr. 23, 1940 |
| 2,424,243 | Lowell | July 22, 1947 |
| 2,468,112 | Rosen | Apr. 26, 1949 |